Figure 1:
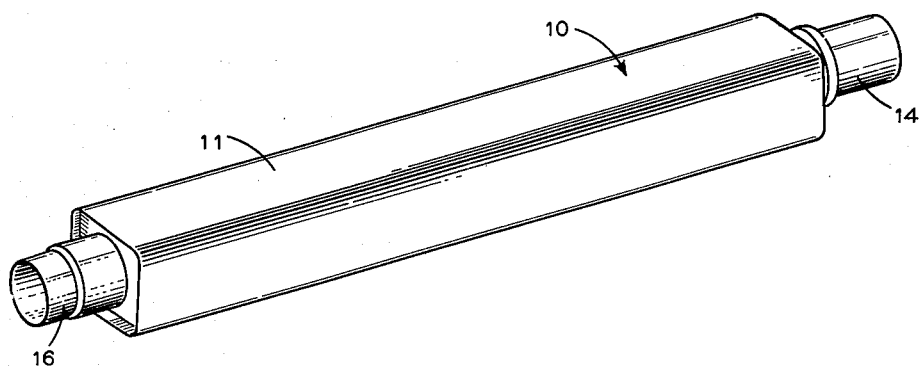

March 1, 1966  J. C. DEDDENS ET AL  3,238,108
BUNDLE-TYPE NUCLEAR FUEL ELEMENT HAVING NOVEL ARRANGEMENT
OF FISSIONABLE AND FERTILE MATERIAL
Filed April 17, 1959  3 Sheets-Sheet 1

INVENTORS
James C. Deddens
BY Howard S. Barringer

ATTORNEY

March 1, 1966   J. C. DEDDENS ET AL   3,238,108
BUNDLE-TYPE NUCLEAR FUEL ELEMENT HAVING NOVEL ARRANGEMENT
OF FISSIONABLE AND FERTILE MATERIAL
Filed April 17, 1959                                3 Sheets-Sheet 2

INVENTORS
James C. Deddens
BY  Howard S. Barringer

ATTORNEY

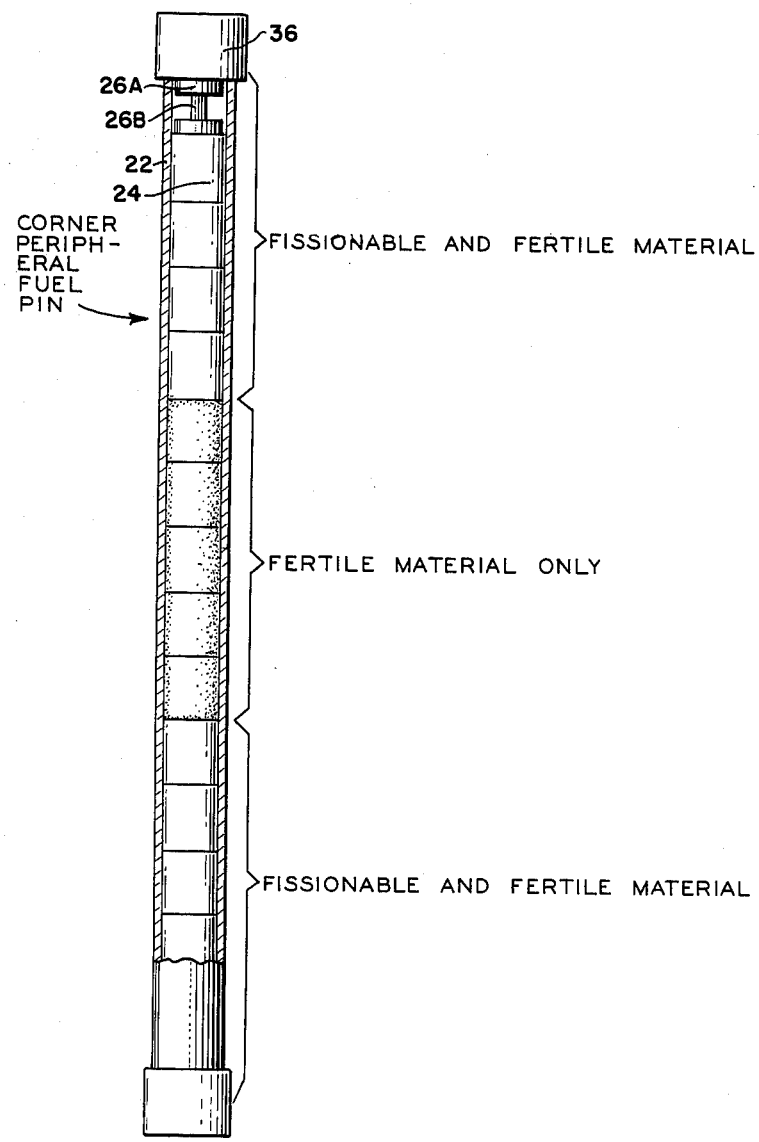

United States Patent Office 3,238,108
Patented Mar. 1, 1966

3,238,108
BUNDLE-TYPE NUCLEAR FUEL ELEMENT HAVING NOVEL ARRANGEMENT OF FISSIONABLE AND FERTILE MATERIAL
James C. Deddens, Lynchburg, and Howard S. Barringer, Rustburg, Va., assignors to The Babcock & Wilcox Company, New York, N.Y., a corporation of New Jersey
Filed Apr. 17, 1959, Ser. No. 807,165
3 Claims. (Cl. 176—68)

This invention relates in general to heterogeneous nuclear reactors and more particularly to a fuel element for use in a heterogeneous nuclear reactor.

In heterogeneous nuclear reactors a fissionable material and a moderator are arranged as discrete bodies usually in a geometric pattern to form a core in which a fission chain reaction can be produced. Heat generated within the core by the chain reaction is in turn converted into useful energy. In order to provide for the efficient use of the heat generated, particularly when it is used for the commercial generation of power, the arrangement of fissionable material, or fuel as it is usually referred to, within the core and the provision for the flow of coolant about the fuel are factors of great importance.

In heterogeneous reactors the core generally consists of a number of fuel elements. The fuel element is the basic unit within which the fuel is arranged for the assembly of the core and is made up usually of a number of fuel components. These fuel components contain the fissionable material, generally in combination with a fertile material. A fertile material is one that is capable of being transformed into fissionable material by the capture of a neutron. A common example is thorium, which decays through the intermediate element protactinium to yield a fissionable isotope of uranium ($U^{233}$).

One of the problems that has existed in the operation of heterogeneous nuclear reactors has been the uneven distribution of power within the core. Because of this it has been difficult to produce a specified power level in the core without the risk of a burnout of some elements while others operate at uneconomically low levels. A burnout generally occurs when the amount of heat generated in the fuel is greater than the coolant can remove. A burnout will result in the failure of a fuel element and is usually caused either by maximum power peaking within a portion of the core or by the blocking of a coolant flow channel.

For the efficient operation of the core it is important to limit the variation therein between the maximum and the average power peaking. By obtaining a more uniform power distribution throughout the core specified power can be achieved without the possibility of burnout.

One of the factors which contribute to non-uniform power distribution is localized power peaking in the flow channel between fuel elements. It is an object of this invention to provide a fuel element arrangement wherein localized power peaking in the flow channels between fuel elements is reduced.

Accordingly, the present invention provides a fuel element in which a plurality of fuel components containing a mixture of fertile and fissionable material are arranged in a bundle of polygonal cross-section. The peripheral fuel components in the bundle have a lower fissionable material content than that in the internal fuel components. The corner peripheral fuel components contain a mixture of fissionable and fertile material at their ends spaced by an intermediate section containing fertile material.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a certain specific embodiment of the invention is illustrated and described.

Figure 3:
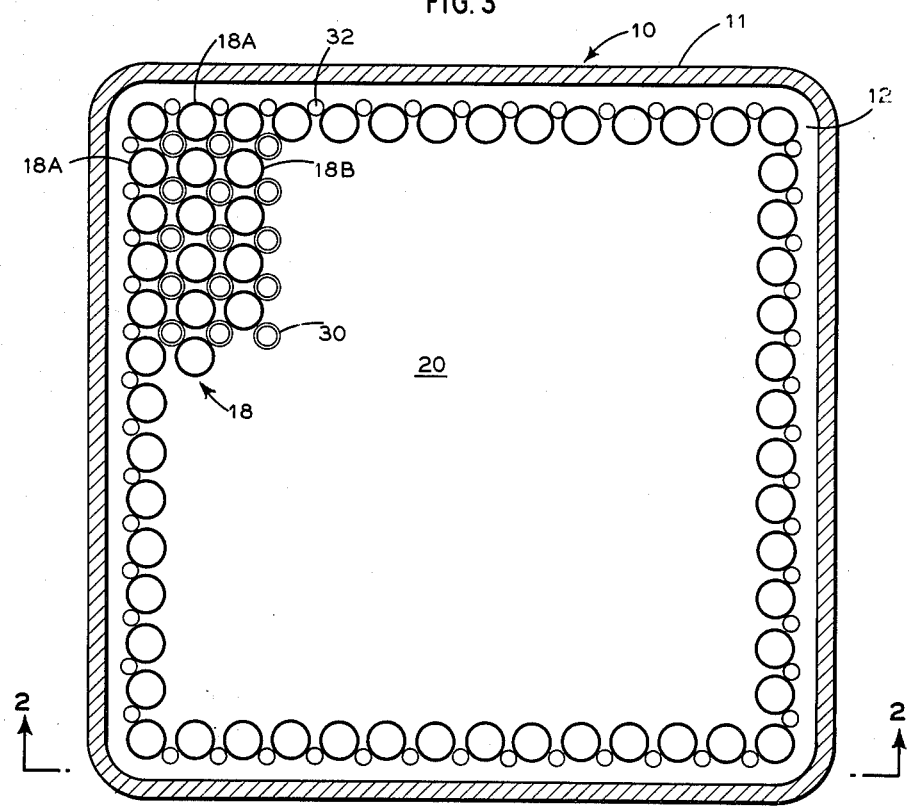
Figure 2:
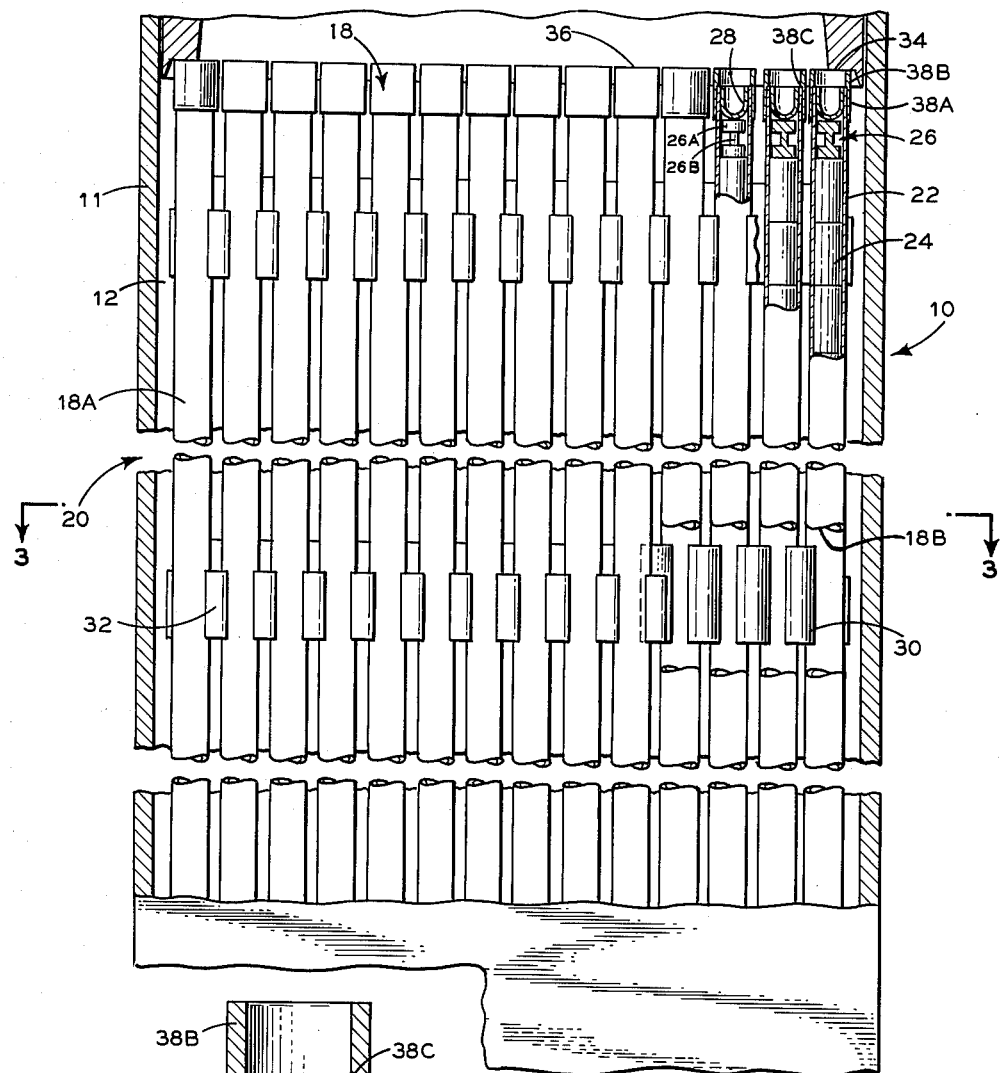
Figure 4:
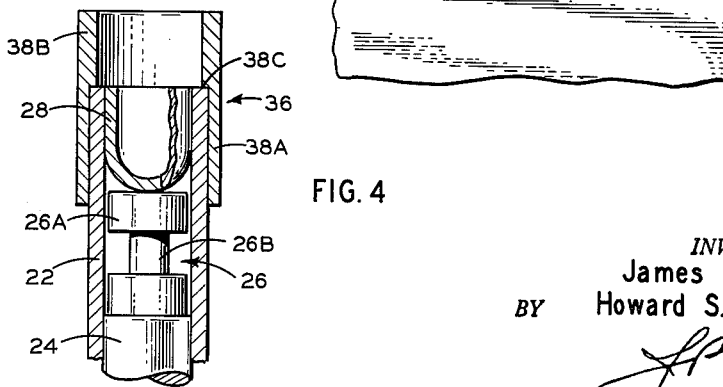

Of the drawings:
FIG. 1 is a three dimensional view of a preferred embodiment of the fuel element;
FIG. 2 is a partial elevation view of a preferred embodiment of the fuel element shown partly in section and taken along the line 2—2 in FIG. 3;
FIG. 3 is a horizontal cross-section of the fuel element taken along a line 3—3 in FIG. 2;
FIG. 4 is an enlarged partial vertical section of the fuel pin shown in FIG. 2; and
FIG. 5 is an enlarged vertical sectional view of a corner peripheral fuel pin of the fuel element shown in FIG. 3.

Referring now to the drawings, FIG. 1 shows the exterior arrangement of a preferred embodiment of the fuel element 10. The fuel element 10 comprises walls 11 forming an elongated flow chamber 12 of generally square cross-section. An inlet opening 14 is positioned at one end of the flow chamber and an outlet opening 16 is arranged at the opposite end thereof.

For a typical example of a heterogeneous nuclear reactor within which the fuel element of this invention could be used, reference is made to the reactor illustrated and described in the co-pending application of the common assignee Serial No. 712,512, M. F. Sankovich, filed January 31, 1958 now abandoned and refiled October 9, 1961 as Serial No. 145,012. The reactor shown in the co-pending application is of the pressurized water type in which pressurized water acts both as the coolant and moderator. The fuel element as shown therein is vertically arranged and placed within the core so that the coolant, which removes the heat generated in the nuclear fission chain reaction, flows upwardly both through and about the exterior of the fuel element.

The fuel element 10 contains a number of vertically elongated fuel components or pins 18 uniformly spaced in a square lattice to form a bundle 20 of generally square cross-section. The cross-sectional area of the bundle is slightly smaller than the interior cross-sectional area of the flow chamber 12 so that the perimeter of the bundle is closely spaced from the walls 11 of the flow chamber.

Each of the fuel pins 18 (FIGS. 2 and 4) comprises an elongated open-ended tube 22 of circular cross-section. A column of cylindrically shaped fuel pellets 24 are arranged in end-to-end relationship within the tube. The pellets are formed of a mixture of fissionable and fertile material. A metallic insulating pellet 26 is positioned at the end of the column of fuel pellets. The end of the tube 22 is sealed by a hollow hemispherical end cap 28 which is integrally joined to the tube.

The metallic insulating pellet 26 is formed in the shape of a dumb-bell. It has two similar circular end portions 26A which have cross-sectional areas substantially equal to the cross-sectional area of the fuel pellets. These end portions are separated by a circular middle portion 26B having a cross-sectional area considerably smaller than that of the end portions. The shape of the insulating pellet makes it particularly adaptable for reducing the thermal stresses in the end caps.

The fuel pins 18 of the bundle 20 are divided into peripheral and internal fuel pins 18A, 18B, respectively. The peripheral fuel pins 18A contain a lower fissionable material content than that of the internal fuel pins 18B. The purpose of this arrangement is to avoid the power peaking which occurs in the flow channels between fuel elements. This power peaking results from an increase in the thermal neutrons caused by the effect of the moderator in regions within the core where the quantity of coolant is the largest. Since the peripheral fuel pins are closest to the coolant flow channels between fuel elements by reducing their fissionable material content the localized power peaking is reduced and a more uniform power distribution throughout the core in obtained.

In addition to the variation of the fuel concentration between the peripheral fuel pins 18A and the internal fuel pins 18B the corner peripheral fuel pins are further varied as to content. In the corner peripheral fuel pins as is illustrated in FIG. 5 the fuel pellets at each end contain the same ratio of fissionable to fertile material as contained in the other peripheral fuel pins, however, the fuel pellets in the longitudinal middle third of the pin contain only fertile material.

It has been found that bundles of fuel pins within the core of a nuclear reactor tend to bow in a radial direction away from the center of the core. Due to the arrangement of the bundle of fuel pins in the preferred embodiment illustrated herein the tendency is for the bundle to bow diagonally across the flow chamber away from the center of the core. When this occurs the longitudinal mid-portion of the corner peripheral fuel pins most remote from the center of the core will come in contact with the wall 11 of the flow chamber 12 and the flow of coolant thereabouts will be blocked. Since, originally there is no fissionable material within the mid-portion of this corner peripheral fuel pin the only heat generated therein by the fission reaction will occur after the fertile material begins its transformation into fissionable material. The quantity of heat generated within this mid-portion will be considerably less than that generated within the end portions which contain both fissionable and fertile material. Therefore, the flow of coolant in the vicinity of the area of contact will be sufficient to remove the heat generated in the mid-portion and to avoid failure of the corner peripheral fuel pin due to overheating.

Short round tubular internal ferrules 30 are placed within the bundle 20 with their central axes in parallel relationship with the longitudinal axis of the fuel pins 18 to space the pins. The internal ferrules 30 are located in a number of equally spaced parallel transverse planes along the length of the bundle. Like the fuel pins the ferrules are arranged in a square pattern with each ferrule contacting four fuel pins. The ferrules and fuel pins are integrally connected to form an unitary bundle.

Short round tubular peripheral ferrules 32 smaller both in length and diameter than the internal ferrules 30 are disposed between and integally joined to the peripheral fuel pins 18A. The peripheral ferrules 32 are disposed in common transverse planes with the internal ferrules 30 and their central axes are in coparallel relationship. The peripheral ferrules are positioned wholly outside a longitudinally plane which extends through the central axes of the peripheral fuel pins. A longitudinal portion of the peripheral ferrules projects transversely beyond the perimeter of the bundle of fuel pins. In the event the bundle of fuel pins bows toward a wall of the flow chamber the portion of the peripheral ferrules projecting beyond the bundle will act as a bumper to keep the peripheral fuel pins in spaced relationship from this wall. By maintaining this spaced relationship proper cooling of the peripheral fuel pins can be sustained and the possibility of failure due to overheating avoided.

The bundle 20 is positioned within the flow chamber 12 so that each end of the peripheral fuel pins of the bundle 20 bears against a shoulder 34 (FIG. 2). Because of manufacturing tolerances there is the problem of maintaining even bearing of the peripheral fuel pins against this shoulder. To achieve even bearing end support sleeves 36 are provided which fit over the ends of the peripheral fuel pins and are integrally attached thereto. These sleeves are formed of short lengths of circular tubing having a uniform outside diameter. However, the interior of the sleeve is divided transversely into a first and a second section 38A, 38B, each having a different inside diameter. The first section 38A has a diameter sufficiently large to permit it to fit closely over the end of the fuel pin. The second section 38B extends axially from the end of the fuel pin and has an inside diameter which is smaller than the diameter of the fuel pin. The difference in the inside diameters provides a shoulder 38C against which the transverse end edge of the fuel pin rests.

The length of the second section 38B is greater than the sum of the allowable plus and minus tolerances of the fuel pins. Due to this feature the ends of the second sections will extend beyond the ends of all the peripheral fuel pins. To provide peripheral fuel pins of uniform length between the bearing surfaces the second sections 38B are cut off in a plane perpendicular to the longitudinal axis of the bundle and beyond the ends of any of the fuel pins. In this way all of the peripheral fuel pins with the end support sleeves attached will be of equal length and the length or structure of the peripheral fuel pins themselves will not be altered or affected.

The fitting placed on the ends of the peripheral fuel pins has been illustrated and described as a sleeve fitting over the end of the pin. However, it should be understood that other fittings which provide a section projecting axially from the ends of the fuel pins could also be used.

The following is a list of the materials and nominal dimensions for a preferred embodiment of the fuel element described herein:

Fuel Element—
Fuel _____ $ThO_2$–$UO_2$ mixture.
Fuel enrichment _____ Fully enriched $UO_2$.
Fuel pin tube _____ 304 stainless steel.
Fuel element walls _____ Zircaloy–2.
Ferrules _____ 304 stainless steel.
Insulating pellet _____ 303 stainless steel.
Fuel pellet diameter _____ 0.2625 in.
Insulating pellet diameter _____ 0.2625 in.
Insulating pellet length _____ 0.250 in.
Fuel pin tube diameter _____ 0.304 in.
Fuel pin tube thickness _____ 0.020 in.
Fuel pin tube length _____ 102 in.
Fuel pin spacing (square lattice) ___ 0.374 in. nominal.
Active fuel length per fuel pin _____ 98.5 in.
Internal ferrule—O.D. _____ 0.225 in.
Internal ferrule—I.D. _____ 0.189 in.
Internal ferrule—length _____ 0.750 in.
Peripheral ferrule—O.D. _____ 0.125 in.
Peripheral ferrule—I.D. _____ 0.095 in.
Peripheral ferrule—length _____ 0.50 in.
Spacing of ferrule planes _____ 8.32 in.
Number or ferrule planes _____ 13.
Fuel element—outside width _____ 5.701 in.
Fuel element—wall thickness _____ 0.155 in.
End support sleeve—length _____ 0.44 in.
End support sleeve—length:
    First section _____ 0.25 in.
End support sleeve—length:
    Second section _____ 0.19 in.
End support sleeve—O.D. _____ 0.368 in.
End support sleeve—I.D:
    First section _____ 0.312 in.
End support sleeve—I.D.:
    Second section _____ 0.218 in.
Typical concentration of $U^{235}$ in fuel pins:
    Peripheral fuel pin _____ 29.69 gm./pin.
    Corner peripheral fuel pin __ 19.90 gm./pin.
    Internal fuel pin _____ 37.12 gm./pin.
    Total fissionable and fertile
        material _____ 800 gm./pin.

This invention provides a fuel element in which the arrangement of the fissionable material affords a twofold advantage. First, the reduction in the quantity of fissionable material in the peripheral fuel pins as compared with the internal pins reduces localized power peaking and permits a more uniform power distribution in the core. Second, the initial use of only fertile material in the middle third of the corner peripheral fuel pins prevents overheating and failure of these pins in the event they contact the walls of the flow chamber.

Therefore, this invention provides a fuel element which affords a more uniform power distribution in the core and thereby permits the attainment of specified power without danger of burnouts. In addition, by achieving a more uniform power distribution the maximum power output of the core will be increased.

Although the fuel element has been illustrated as square, it is possible that it may take other shapes such as rectangular or polygonal. It also should be understood that a circular fuel element could be used. However, in such an arrangement there would be no corner peripheral fuel pins. While the preferred embodiment of the fuel element is shown having an enclosing container it is possible that the arrangement disclosed herein could be used to equal advantage without the enclosing container.

Further the fuel pins and ferrules are not restricted to a circular transverse cross-section. It is contemplated that other shapes could be used, for example elliptical, square, or triangular. The preferred method of integrally joining the ferrules and the end support sleeves to the fuel pins to form a unitary bundle is by brazing. However, other methods of integral attachment might be used.

While in accordance with the provisions of the statutes we have illustrated and described herein the best form of the invention now known to us, those skilled in the art will understand that changes may be made in the form of the apparatus disclosed without departing from the spirit of the invention covered by my claims, and that certain features of our invention may sometimes be used to advantage without a corresponding use of other features.

What is claimed is:

1. A fuel element for use in a heterogeneous nuclear reactor comprising a plurality of separate laterally spaced elongated fuel components containing a mixture of fissionable and fertile material arranged in a regular geometric pattern to form a bundle having a polygonal transverse cross-section, the peripheral fuel components bounding the transverse cross-section of said bundle containing a lower fissionable material content than the interior fuel components, and the corner peripheral fuel components in the transverse cross-section of said bundle containing a mixture of fissionable and fertile material at each end with fertile material positioned therebetween.

2. A fuel element for use in a heterogeneous nuclear reactor comprising walls forming an elongated flow chamber of polygonal transverse cross-section having a coolant inlet opening in one end thereof and a coolant outlet opening in the opposite end, a plurality of separate uniformly shaped laterally spaced elongated fuel pins containing a mixture of fissionable and fertile material and arranged in a regular geometric pattern to form a bundle of substantially the same transverse cross-sectional shape as said flow chamber, said bundle arranged within and closely spaced from the walls of said flow chamber and having the longitudinal axis of the fuel pins in parallel relationship with the walls thereof, the peripheral fuel pins bounding the transverse cross-section of said bundle containing a lower fissionable material content than the interior fuel pins, the corner peripheral fuel pins in the transverse cross-section of said bundle containing a mixture of fissionable and fertile material at each end with fertile material positioned therebetween.

3. A fuel element for use in a heterogeneous nuclear reactor comprising walls forming an elongated flow chamber of polygonal transverse cross-section having a coolant inlet opening in one end thereof and a coolant outlet opening in the opposite end, a plurality of separate uniformly shaped laterally spaced elongated fuel pins arranged in a regular geometric pattern to form a bundle of substantially the same transverse cross-sectional shape as said flow chamber, each of said fuel pins comprising an elongated open ended tube of circular cross-section, a column of cylindrically shaped fuel pellets arranged within said tube and containing a mixture of fissionable and fertile material, a metallic insulating pellet positioned at the end of said column of fuel pellets within said tube, and end caps within each end of said tubes to provide sealed closures therefor, said bundle arranged within and closely spaced from the walls of said flow chamber and having the longitudinal axis of the fuel pins in parallel relationship with the walls thereof, the peripheral fuel pins bounding the transverse cross-section of said bundle containing a lower fissionable material content than the interior fuel pins, and the corner peripheral fuel pins in the transverse cross-section of said bundle containing a mixture of fissionable and fertile material at each end with only fertile material positioned therebetween.

References Cited by the Examiner

UNITED STATES PATENTS

| | | | |
|---|---|---|---|
| 2,774,730 | 12/1956 | Young | 176—43 |
| 2,838,452 | 6/1958 | West et al. | 176—69 |
| 2,848,404 | 8/1958 | Treshow | 176—44 |
| 2,863,815 | 12/1958 | Moore et al. | 176—29 |
| 2,947,678 | 8/1960 | Gimera et al. | 176—75 |
| 2,982,713 | 5/1961 | Sankovich et al. | 176—61 |

FOREIGN PATENTS 788,284  12/1957  Great Britain.

OTHER REFERENCES

AEC Document: NAA–SR–1936, Sept. 1, 1957, in particular page 21.

AEC Document: MonP–412, published Sept. 25, 1947, declass. Jan. 24, 1956.

A Glossary of Terms in Nuclear Science and Technology: 1957, pages 57, 62, and 65. QC 772 N3.

REUBEN EPSTEIN, *Primary Examiner.*

ROGER L. CAMPBELL, OSCAR R. VERTIZ, CARL D. QUARFORTH, *Examiners.*